United States Patent [19]
Ahmed

[11] 3,825,778
[45] July 23, 1974

[54] TEMPERATURE-SENSITIVE CONTROL CIRCUIT

[75] Inventor: Adel Abdel Aziz Ahmed, Annandale, N.J.

[73] Assignee: RCA Corporation, New York, N.Y.

[22] Filed: Feb. 9, 1973

[21] Appl. No.: 331,234

[52] U.S. Cl. .................. 307/310, 307/254, 307/297
[51] Int. Cl. .................. H03k 17/00
[58] Field of Search .................. 307/310, 296, 297; 317/235, 29; 324/105

[56] References Cited

UNITED STATES PATENTS

| | | | |
|---|---|---|---|
| 3,271,660 | 9/1966 | Hilbiber | 307/310 X |
| 3,281,656 | 10/1966 | Noble | 307/310 X |

*Primary Examiner*—Rudolph V. Rolinec
*Assistant Examiner*—B. P. Davis

[57] ABSTRACT

A temperature sensitive switching circuit includes a current source supplying two groups of serially connected diodes. The number of such diodes in the first group is smaller than that in the second so that the first group drawn substantially all of the source current and the second only an infinitesimal portion of this current. As temperature increases, the voltage across both groups of diodes decrease, but the ability of the second group to carry a substantial amount of current increases at a more rapid rate than this decreased voltage would tend to reduce such current, and increases non-linearly with temperature above a given threshold temperature. This non-linear increase in current flow may be used to sense temperature change and also to control the power responsible, either directly or indirectly, for this temperature change.

21 Claims, 6 Drawing Figures

TEMPERATURE-SENSITIVE CONTROL CIRCUIT

The present invention relates to temperature-sensitive control switches such as may be used to interrupt the application of operating potential to semiconductor electrode apparatus when it is overheated and particularly to such switches as employ semiconductor rectifiers to sense temperature rise.

It is known to employ a resistive divider receiving a well-regulated potential to supply a bias level to the base electrode of a grounded-emitter amplifier transistor in temperature-sensitive control switches. The potential divider uses resistances with similar temperature coefficients so its output potential varies little with temperature change. The base-emitter potential which must be applied to the transistor to support substantial collector current conduction lessens with increasing temperature. With proper choise of potential-divider output potential, the collector current of the transistor can be maintained negligible so long as its temperature does not exceed a threshold value, and yet the current can be made to increase substantially when the temperature of the transistor further increases.

The transistor is often constructed in monolithic integrated circuit form together with the circuitry controlled by its collector current.

When the prior art circuit is so constructed on a mass production basis, it is difficult to obtain the same threshold temperature value for all units without need for adjustments. The regulated potential employed for the divider is developed across a zener or avalanche diode in most instances, and these do not break down at the same potential, unit to unit. Also, the ratio of the potential divider resistances varies from unit to unit. Also, the collector current characteristic of the transistor as a function of base-emitter potential and temperature varies from unit to unit.

In practice, these prior art units exhibit a range of threshold temperatures extending over tens of degrees Kelvin due to manufacturing variations, unless adjustments are subsequently made. Adjusting the circuitry unit-by-unit is undesirable, but the only alternatives have been to make compromises in other circuitry to accomodate the wide range of threshold temperatures or to discard units which do not meet specifications.

The present invention is embodied in a temperature sensitive switching circuit comprising a combination of first circuit means, second circuit means and current supply means. The first circuit means is adapted to receive a substantially constant current and responds thereto to exhibit a voltage-versus-temperature characteristic wherein the voltage decreases with temperature. The second circuit means responds to the voltage exhibited by the first circuit means. The second circuit means includes means which exhibit the same voltage versus temperature characteristic as the first circuit means if operated at the same current level. However, the second circuit means receives a smaller current than the first circuit means and at this smaller current exhibits a voltage versus temperature characteristic in which the voltage decreases with temperature at a more rapid rate than in the characteristic of the first circuit means. The current supply means is connected to the second circuit means and directs at least a portion of its current to the second circuit means in response to the requirement of the second circuit means as the temperatures of the first and second circuit means rise together.

The present invention is embodied in a series-parallel combination of semiconductor rectifiers to which a current to forward bias them is applied. A first parallel path in the combination which contains a greater number of semiconductor rectifiers than in a second parallel path, includes as one of the serially connected rectifiers therein the base-emitter junction of a transistor. As the temperature of the series parallel combination is increased beyond a threshold value, the collector current of the transistor shows a marked substantial increase. A current controlled switching means responds to the increase in collector current.

The present invention is illustrated in the drawing of which:

Figure 1:
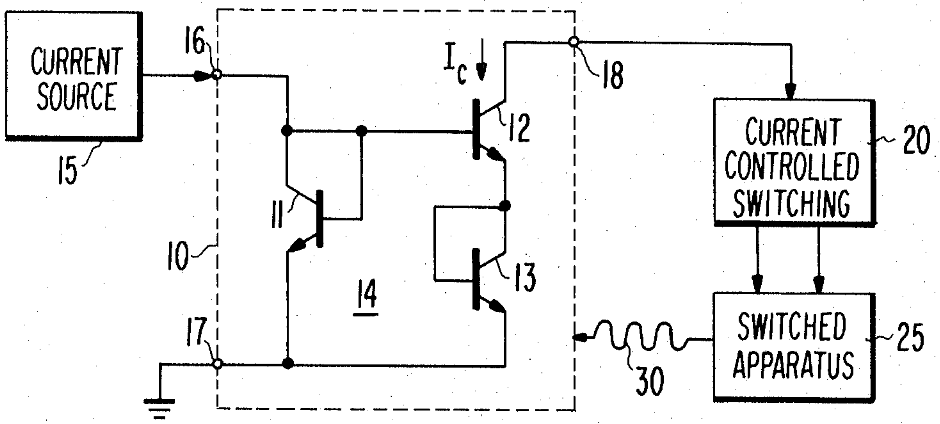
FIG. 1 is a schematic diagram, partially in block form, of an embodiment of the present invention.

Referring to FIG. 1, the temperature sensing unit 10 comprises transistors 11, 12, 13, each formed in an integrated circuit as a result of the same sequence of processing steps known in the art—for instance, selective etching of and diffusion into a monolithic silicon die. The operating temperatures of transistors 11, 12, 13 are substantially equal because of their proximity within the integrated circuit. Each of the transistors 11, 13 is connected to function solely as a semiconductor rectifier diode, its joined base and collector electrodes providing the anode of the diode and its emitter electrode providing the cathode.

A direct-current supply 15 is coupled to terminals 16, 17 of the temperature sensing unit 10 to forward bias the series-parallel combination 14 of the diode 11 in a first parallel path of the combination 14, and of the base-emitter junction of transistor 12 and diode 13 serially connected in a second parallel path of the combination 14.

At lower temperatures of the sensing unit 10, a portion of the current from supply 15 flows through diode-connected transistor 11, developing a potential $V_{BE11}$ thereacross. $V_{BE11}$ as applied to the serial combination of the base-emitter junctions of transistors 12, 13 causes potentials $V_{BE12}$, $V_{BE13}$, respectively, to appear across each of these junctions. Because of the serial connection of the collector-to-emitter paths of transistors 12, 13, their collector currents are substantially equal. Therefore, the potentials $V_{BE12}$ and $V_{BE13}$ to support these collector current levels, are substantially equal and each is substantially one-half $V_{BE11}$.

Since the collector current of a transistor is exponentially related to its $V_{BE}$, the collector currents of transistors 12, 13 are orders of magnitude smaller than that of transistor 11. Not only is the portion of source 15 current passing into the base of transistor 12 small because of the current gain of transistor 12; it is small because the collector current of transistor 12 is small because of the low $V_{BE12}$ potential. At lower temperatures, the collector current $I_C$ of transistor 12 withdrawn from the current-controlled switching means 20 via terminal 18, is then negligibly small.

Figure 2:
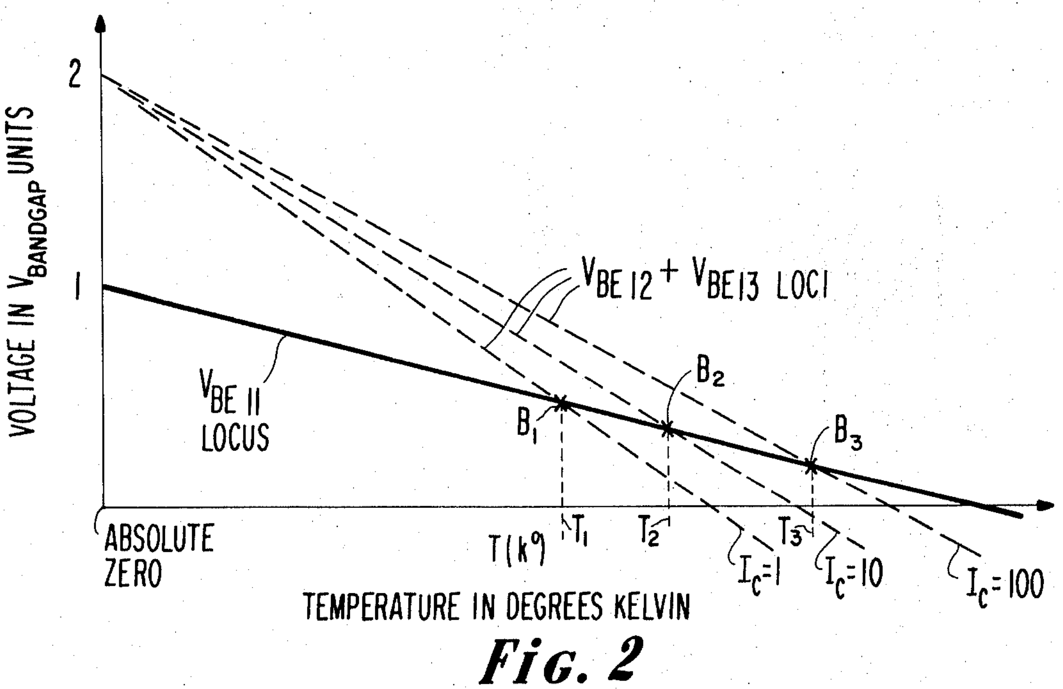
FIGS. 2 and 3 are graphical aids illustrating the operational characteristics of the embodiment of FIG. 1 and affording a method of analysis which can be extended to other embodiments of the invention.

When the temperature of the sensing unit 10 increases substantially, there is a decrease in $V_{BE11}$ developed across diode-connected transistor 11 by the substantially constant current applied thereto from source 15. (The solid line curve of FIG. 2 plots this characteristic). Both $V_{BE12}$ and $V_{BE13}$ decrease with temperature increase, so their sum $V_{BE12} + V_{BE13}$ would decrease at a more rapid rate than $V_{BE11}$ if their collector currents were maintained constant. (The dashed line curves of FIG. 2 show the variation of $V_{BE12} + V_{BE13}$ with temperature T at three different levels of constant collector current, which levels are proportioned 1 to 10 to 100.) However, $V_{BE12} + V_{BE13}$ is constrained to be equal to $V_{BE11}$ since the two circuits are connected in parallel between terminals 17, 16. Therefore, as temperature rises and $V_{BE11}$ reduces in value, reducing $V_{BE12} + V_{BE13}$ correspondingly at a slower rate than it would be were the collector currents of transistors 12 and 13 held constant, these collector currents cannot remain constant and indeed must increase. In terms of FIG. 2, the circuit operating point moves to the right along the solid line curve from say $B_1$ at temperature $T_1$, to $B_2$ at temperature $T_2$, to $B_3$ at temperature $T_3$ and the collector current $I_c$ exhibits a change non-linearly related to the corresponding temperature change.

The operation above also can be explained in terms of the current-versus-voltage characteristic of the baseemitter junction of transistor 12 (not shown). At lower temperatures, the operating point is in the high-resistance, nearly constant current portion of the characteristic. As the temperature increases, the characteristic shifts to the left along the $V_{BE12}$ axis, that is, the knee of the characteristic moves to lower values of $V_{BE12}$. The operating point also moves to a lower voltage with increasing temperature as per the solid line of FIG. 2, but not so rapidly as the voltage at which the knee of the characteristic occurs. The result is a shifting of the circuit operating point from the high-resistance region of the characteristic of the base-emitter junction of transistor 12 into the knee of the characteristic and towards the low-resistance, nearly constant voltage portion of the characteristic. The result is a very sharp increase in the base current flow to transistor 12, this increase occurring at a critical temperature, $T_{THRESHOLD}$. $T_{THRESHOLD}$ has been found to be substantially invariant for temperature sensing units made within the same production run and in different production runs.

The operation described above corresponds to increasing the forward bias placed on the base-emitter junction of transistor 12 to a point such that substantial base current begins to flow. As is well known, such an increase in forward bias results in an exponential increase of the collector current of a transistor. Consequently, the increased forward bias impressed upon the base-emitter junctions of transistors 12, 13 by diode-connected transistor 11 causes an exponential increase in $I_C$, the collector current of transistor 12, as the temperature of the temperature sensing unit 10 and the elements 11, 12, 13 therein is raised above $T_{THRESHOLD}$.

This increased $I_C$, while orders of magnitude larger than $I_C$ at lower temperature levels, is still small as compared to the current provided from source 15. The base current of transistor 12 is smaller yet by the common-emitter forward current gain ($h_{fe}$) of transistor 12. So, the major portion of the current from source 15 continues to be supplied to the diode-connected transistor 11.

$I_C$, the collector current of transistor 12, is therefore negligible small when sensing unit 10 is at lower temperatures, such as room temperature. When the temperature of sensing unit 10 exceeds a threshold temperature, $I_C$, although still small, exhibits an incrase by orders of magnitude. The characteristics of this operation can be predicted using a graphical method plotting the characteristics of devices used in the two parallel paths of the series-parallel combination against each other as shown in FIG. 2.

FIG. 2 sketches (in solid line) the base-emitter offset potential of transistor 11 ($V_{BE11}$) as a function of absolute temperature for the collector current level supplied from the current supply. FIG. 2 also sketches (in dotted lines) the summed base-emitter offset potentials ($V_{BE12} + V_{BE13}$) of the serially connected base-emitter junctions of transistors 12 and 13 as a function of absolute temperature T for three transistor 12 collector current ($I_C$) levels related in the ratio 1:10:100.

At absolute zero, the $V_{BE}$'s of transistors 11, 12, 13 all equal the bandgap potential $V_{BANDGAP}$ peculiar to the semiconductor material from which they are made. The slope of the $V_{BE}$ versus temperature characteristic of a transistor decreases with increasing collector current levels, its $V_{BE}$ (base-emitter direct potential offset) being logarithmically related to its collector current. This well known relationship is the basis for the $V_{BE}$ versus temperature loci shown in FIG. 2.

The series-parallel connection of transistors 11, 12, 13 forces the $V_{BE}$ of transistor 11 and the summed $V_{BE}$'s of transistors 12, 13 always to be equal. That is, $v_{be11}$ must equal $V_{BE12}+V_{BE13}$ at all times for any given temperature. At any given temperature this determines what the collector current level through transistors 12, 13 must be, since the $V_{BE12}+V_{BE13}$ characteristic for this current level (of $I_C$) is the only one of the $V_{BE12} + V_{BE13}$ loci to intercept the $V_{BE11}$ characteristic of transistor 11 for its fixed collector current level at that given temperature.

Figure 3:
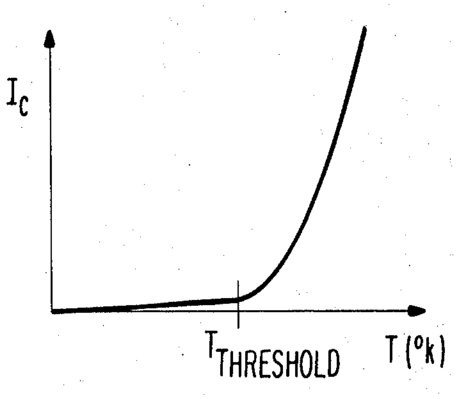

FIG. 3 is a graph showing in a qualitative way, the collector current level through transistors 12, 13 as a function of temperature. This two-dimensional plot derived from a three-dimensional plot of the sort shown in FIG. 2, eliminating voltage as a variable by causing it always to equal its intercept value. As can be seen from FIG. 3, the collector current of transistor 12 rapidly increases as the temperature increases beyond a threshold value $T_{THRESHOLD}$.

This temperature $T_{THRESHOLD}$ is a function primarily of the scaling of the $V_{BE}$'s of the transistors 11, 12, 13. The ratio of transistor $V_{BE}$'s on an integrated circuit is amongst the best defined of its parameters. Variation in the direct current from the supply 15 will cause half as large a percentage variation in the collector current of transistor 12. More importantly, $T_{THRESHOLD}$ will be substantially unaffected by variation of the current from supply 15.

The current versus temperature characteristic of FIG. 3 indicates that the current-controlled switching means 20 of FIG. 1 can be arranged to switch at a threshold current level located where the slope of this characteristic is steep. Then, switching will occur at a temperature defined within a few degrees Kelvin in all the units of a manufacturing run.

The current-controlled switching means 20 performs a switching function for the switched apparatus 25. For example, the switching means 20 may control the application of operating potentials to portions of the apparatus 25. The switched apparatus 25 may have a thermal coupling 30 to the sensor unit 10, so the sensor unit 10 can sense excessive heat build-up in the apparatus 25 and provide current to the current-controlled switching means 20 changing it from the normal condition where it permits operating potential to be applied to apparatus 25. The removal of operating potential from apparatus 25 will prevent further heat buildup. This thermostatic action can be used to protect semiconductor elements in apparatus 25 from the deleterious effects of over-dissipation. An integrated circuit incorporating elements of the sort shown in FIG. 1, which are used in the manner suggested, will protect itself from over-dissipation.

The collector current provided by transistor 12 in the FIG. 1 embodiment is small, failing to exceed a microampere for an applied 1 milliampere current from supply 15, even when the threshold temperature is exceeded. This shortcoming can be overcome in part by equally increasing the effective base-emitter junction areas of both transistors 12 and 13 with respect to that of transistor 11. When this is done, the collector current of transistor 12 is increased (as compared to the condition where transistors 11, 12, 13 are of like geometry) by a factor equal to the ratio of the effective base-emitter junction area of transistor 12 to that of transistor 11. However, the circuit of FIG. 1 also displays a high threshold temperature.

A better solution in many applications is to add the same number of diode-connected transistors to each of the parallel paths of the series-parallel combination 14. This increases the collector current $I_C$ from transistor 12 when the threshold temperature is exceeded and also lowers the threshold temperature. The table below sets forth the values of $I_C$ when this solution is followed, using transistors with similar geomertry and applying a $1 \cdot 10^{-3}$ ampere current from the supply 15.

| NO. OF RECTIFIERS IN PATH 1, PATH 2 | TEMPERATURE °KELVIN 200 | 300 | 400 |
|---|---|---|---|
| 1, 2 | $10^{-15}$a. | $10^{-9}$a. | $0.3 \cdot 10^{-6}$a. |
| 2, 3 | $0.1 \cdot 10^{-9}$ | $0.1 \cdot 10^{-6}$ | $6 \cdot 10^{-6}$ |
| 3, 4 | $6 \cdot 10^{-9}$ | $1 \cdot 10^{-6}$ | $17 \cdot 10^{-6}$ |
| 4, 5 | $70 \cdot 10^{-9}$ | $3 \cdot 10^{-6}$ | $40 \cdot 10^{-6}$ |
| 5, 6 | $0.3 \cdot 10^{-6}$ | $10 \cdot 10^{-6}$ | $90 \cdot 10^{-6}$ |

Figure 4:
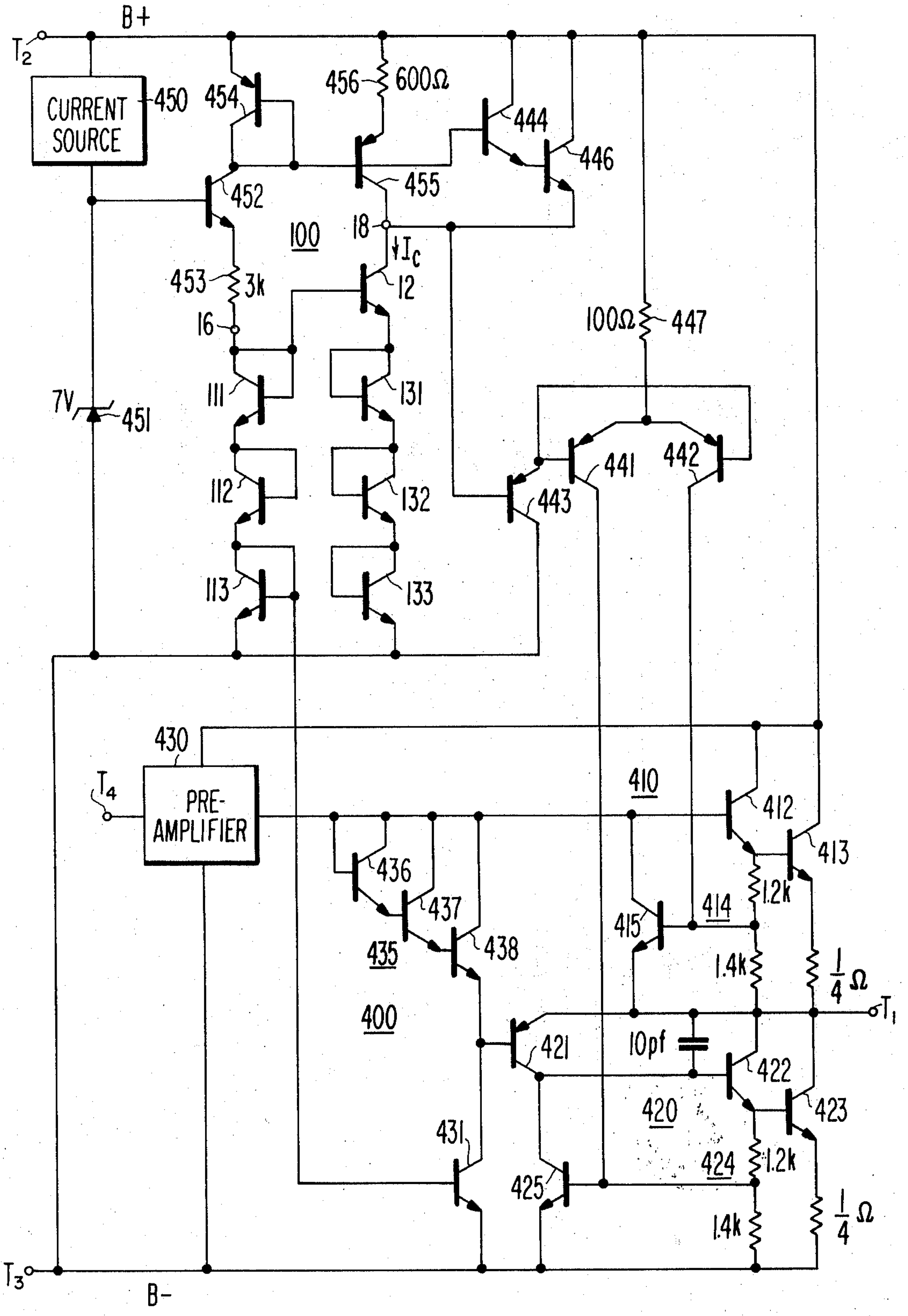
FIG. 4 is a schematic diagram illustrating an alternative embodiment of the present invention, which is a preferred form for decoupling drive currents to an integrated circuit Class B audio power amplifier when its internal dissipation becomes excessive.

The third configuration listed in the above table is used in the sensor unit 100 shown in the schematic diagram FIG. 4. The schematic is of an integrated circuit, audio power amplifier 400 having Class B quasi-complementary output stages 410, 420. The temperature is the integrated circuit amplifier 400 including the sensor unit 100 may rise because of sustained overload conditions upon the output stages 410, 420.

In such case, in accordance with the present invention, the drive current to the input circuits of the output stages 410, 420 is limited in response to the increased collector current drawn by transistor 12 of the sensor unit 100. The excursions of the output currents delivers by the output stages 410, 420 to their output terminal $T_1$ are curtailed in response to the limiting of drive current. This reduces the dissipation in the output stages 410, 420 (the primary source of heat generated within the amplifier 400) and keeps the temperature of the amplifier 400 within acceptable bounds. A more complete explanation of the operation of amplifier 400 follows, to facilitate an understanding of how the sensor unit 100 operates to protect it from over-dissipation.

Operating potential is applied from a B supply (not shown) between terminals $T_2$, $T_3$ of the amplifier 400. Terminal $T_4$ is adapted to receive input signal referred to B supply; and terminal $T_1$, to supply output signal responsive to such input signal and referred to B supply. Input signals applied to $T_4$ are amplifier in pre-amplifier circuitry 430 to provide a drive current for application to the output stages 410, 420. Constant-current transistor 431 completes the path for quiescent current flow from the preamplifier 430. This quiescent current flow through the Darlington configuration 435 comprising transistors 436, 437, 438 establishes a bias potential to overcome in substantial part the base-emitter potentials of transistors 412, 413, 421. This avoids cross-over distortion during transitions in conduction from one of output stages 410, 420 to the other.

Positive halves of the signal portion of the drive current provide increased base current to transistor 412 causing it to supply from its emitter electrode increased base current to output transistor 413. Therefore, both transistors 412, 413 are biased into increased conduction to supply the positive portions of output signal current to terminal $T_1$. Negative halves of the signal portion of the drive current provide increased base current to transistor 421, which responds to supply increased collector current. This increased collector current, supplied as increased base current to transistor 422, biases transistor 422 into increased conduction. Transistor 422 provides increased base current to transistor 423, biasing it into increased conduction. The increased conduction of transistors 421, 422, 423 supplies the negative portions of output signal current to terminal $T_1$.

Resistive potential dividers 414, 424 are included in the emitter circuits of transistors 412, 422, respectively, to provide quiescent base potentials to transistors 415, 425, respectively, to bias them nearly into conduction. The application of collector currents from the transistors 441, 442 to the base electrodes of transistors 415, 425, respectively, will bias them into conduction, providing a clamp parallelling the base-emitter input circuits of transistors 412, 422, respectively, and so diverting the drive currents otherwise applied to these input circuits. As noted before this action, in response to sufficient $I_C$, (collector current of transistor 12) results in curtailment of output currents supplied from the output stages 410, 420 to terminal $T_1$.

A source 450 of temperature-compensated constant current, biases avalanche diode 451 into avalanche, maintaining a substantially constant potential thereacross. The emitter-follower action of transistor 452 maintains its emitter potential at a substantially constant potential $1V_{BE}$ offset voltage across itself so the potential applied to the resistor 453 is substantially constant and causes a current flow therethrough to node 16 of the sensor unit 100. This current flow is about 1.4 milliampere at room temperature, but is reduced to about 1 milliampere at temperatures of 130°C. by the increase in resistance of resistor 453 when so heated.

This current also flows through the emitter electrode of transistor 452, the collector current of which—presuming the transistor has appreciable $h_{fe}$ (common-emitter forward current gain)—is substantially equal to its emitter current. This current applied to the diode-connected transistor 454 develops a $V_{BE}$ across its base-emitter junction to support collector current flow substantially equivalent to the current applied to node 16. This $V_{BE}$ applied to transistor 455, which has an emitter resistor 456, causes transistor 455 to provide a collector current which is a fraction of the collector current flow in transistors 452, 454. (Elements 454, 455, 456 may be viewed as being a current amplifier with a fractional current gain.) The collector circuit of transistor 455 clamps the base electrode of transistor 443 close to the B+ potential applied to terminal $T_2$, preventing base current flow therethrough so long as the collector current of transistor 12 is very small. The sensor unit 100 using semiconductor junctions in its second path with three times the area of those in its first path, provides an $I_C$ at room temperature of 10 to 20 microamperes. This $I_C$ is smaller than the collector current transistor 455 seeks to provide, so transistor 455 continues to clamp the base electrode of transistor 443 close to B+ potential.

Above a threshold temperature of 162°C, the collector current of transistor 12 grows exponentially with increasing temperature, growing larger than the collector current supplied from transistor 455 and causing base current to be drawn from transistor 443. This biases transistor 443 into conduction. The resultant emitter current of transistor 443, larger than its base emitter current by a factor of one plus its $h_{fe}$, is withdrawn from the base electrodes of transistors 441, 442 to bias them into conduction. Their collector currents are supplied to the base electrodes of transistors 415, 425, respectively, to bias them into conduction. As noted above, the transistors 415, 425 then provide clamping action preventing appreciable base current flow to transistors 412, 422.

Transistors 444, 446 in conjunction with diode-connected transistor 454 clamp the maximum excursion of the base potential of transistor 443 to within $3V_{BE}$ of the B′ potential applied to terminal $T_2$. The emitter electrodes of transistors 441, 442 consequently cannot be swung more than $1V_{BE}$ from B+ potential. Resistor 447 can accordingly be selected to limit the collector currents of transistors 441, 442 to prevent unnecessarily high dissipation in this portion of the circuitry.

The $V_{BE}$ developed across diode 113 is a suitable direct potential for biasing the base-emitter junction of transistor 431 so that its collector electrode provides a constant current sink.

The transistor 443 is biased very rapidly into conduction by the sensor unit 100 once the threshold temperature is exceeded. Very little base current is required to bias transistor 443—and subsequently transistors 441, 442—into conduction. The constant collector current of transistor 455 is much larger than this required base current. This causes the transistor 12 to have to supply this small base current at a higher collector current level, to allow for counteracting the collector current of transistor 455; and the required base current for transistor 443 is supplied as the difference between the two collector currents of transistors 12 and 455, which are larger by a substantial factor. The rate of increase of this small difference current with temperature change is thus greater by this factor than the rate of increase of the collector current of transistor 12. Accordingly, the sensitivity of the temperature-sensitive control is enhanced. The threshold temperature is shifted upward slightly, no more than a few degrees.

Figure 5:
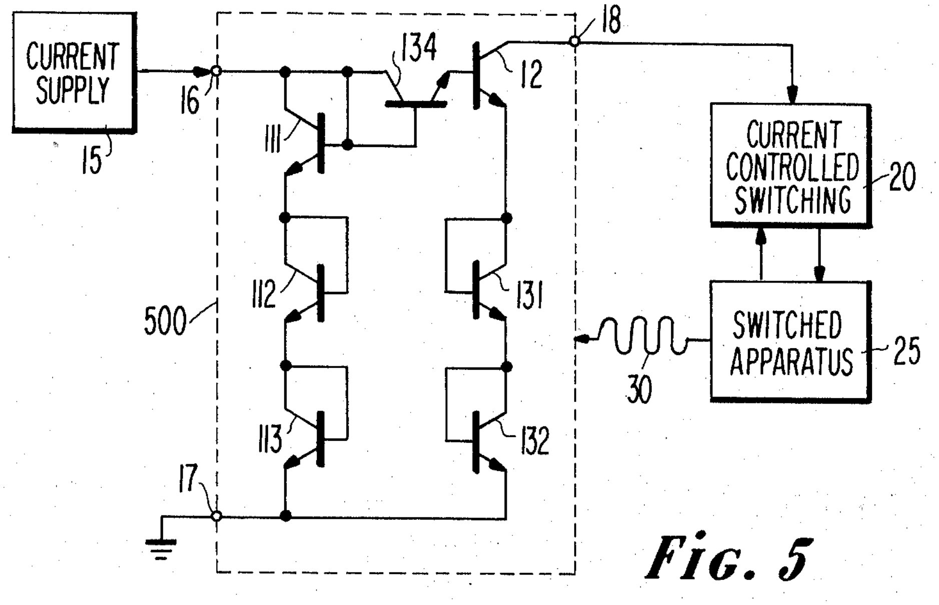
FIGS. 5 and 6 are schematic diagrams, partially in block form, illustrating other embodiments of the present invention.

FIG. 5 shows a sensor unit 500 in which sensitivity of the temperature control is increased by different means, which increase is accompanied by a decrease in the threshold temperature. The diode-connected transistor 133 used in sensor unit 100 of FIG. 4 is omitted from sensor unit 500 of FIG. 5. Rather, a direct connection is used instead, and diode-connected transistor 134 is interposed in the base lead connection of transistor 12. That is, diode-connected transistors can be moved from the emitter-to-ground connection of transistor 12 into its base lead connection. This lowers the current level in the transposed diode-connected transistors and increases the slope of their $V_{BE}$ versus temperature characteristic. Consequently, the threshold temperature at which $I_C$ shows marked increase is lowered, but the rate of $I_C$ increase as temperature increases above threshold temperature is greater.

Figure 6:
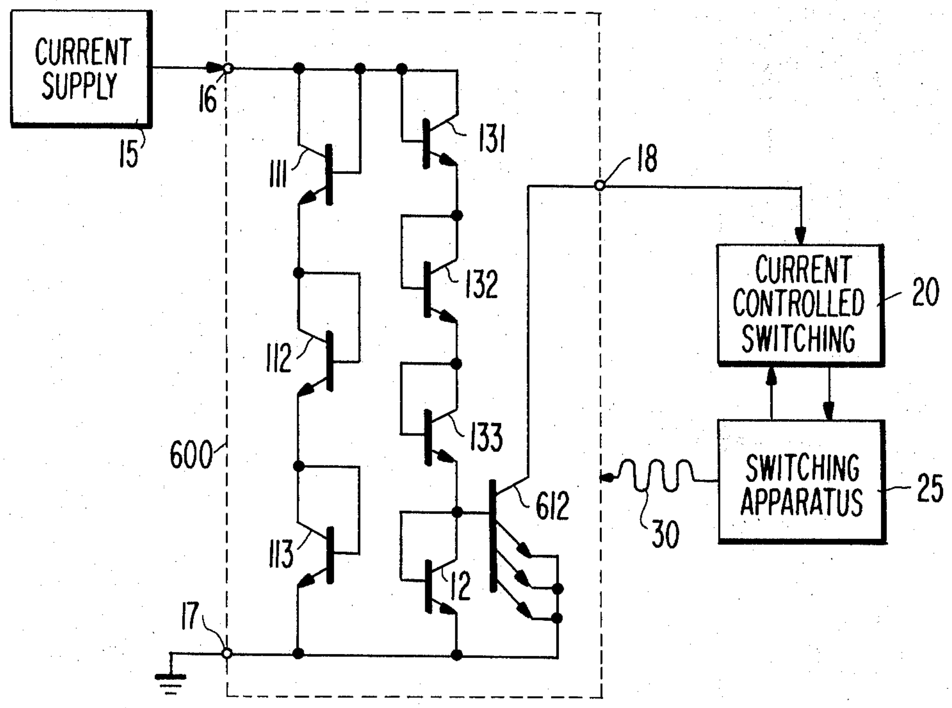

FIG. 6 shows a sensor unit 600 which provides increased output current at terminal 18. It performs similarly to sensor unit 100 of FIG. 4 but takes up less area on a monolithic integrated circuit. Transistor 12 is diode-connected by connecting its base electrode from its collector electrode and is rearranged in its serial connection with diode-connected transistors 131, 132, 133. The current flow through this serial connection establishes a characteristic $V_{BE}$ associated with the current density in the base-emitter junction of transistor 612 which has a base emitter junction area larger than that of transistor 12 by a certain factor. (This may be accomplished by parallelling several transistors having the same geometry as transistor 12 to form transistor 612.) Accordingly, the collector current of transistor 612 will be larger than that of transistor 12 by this factor.

The elements 11, 13, 111, 112, 113, 131, 132, 133, 134 preferably are diode-connected transistors concurrently formed by the same sequence of processing steps. This virtually eliminates the influence of the temperature-dependent effects of saturation currents in these devices upon the threshold temperature. However, other semiconductor rectifying elements may be used in their steads, with acceptable results.

What is claimed is:

1. A temperature-sensitive control switch comprising:

a current-controlled switching means;

a temperature sensing unit;

a first number of semiconductor rectifiers included in said temperature sensing unit and connected in a first serial combination;

a second number of semiconductor rectifiers included in said temperature sensing unit and connected in a second serial combination, said second number being greater than said first number;

a primary current supply connected to a parallel connection of said first and said second serial combinations and arranged for forward-biasing said semiconductor rectifiers in said first and said second serial combinations;

means for applying the potential developed across said first serial combination in response to the portion of said primary current therethrough to said second serial combination; and a transistor included in said temperature sensing unit having a base-emitter junction which is included within said second number of semiconductor rectifiers and having a collector electrode connected to said current-controlled switching means to supply it control current.

2. A temperature-sensitive control switch as claimed in claim 1 having:

an auxiliary current supply for supplying an offset current which is a fraction of that supplied by said primary current supply, said offset current being coupled to said transistor collector electrode to counteract said control current at temperatures lower than a threshold value.

3. Temperature-sensitive control switch comprising:

a primary current supply, a current-controlled switching means, a temperature-sensing unit, a first and a second series connections of semiconductor rectifiers in number N and N + 1, respectively, said first and said second series connections being included in said temperature sensing unit and being in parallel connection with each other to said primary current supply from which each semiconductor rectifier is to be forward biased, said parallel connection being such that the potential developed across said first series connection in response to its semiconductor rectifiers being forward-biased is applied to said second series connection to maintain the forward bias of its semiconductor rectifiers relatively small compared to that of the semiconductor rectifiers in said first series connection, and a transistor included in said temperature-sening unit having a base-emitter junction connected to receive the potential developed across one of said semiconductor rectifiers in said second series connection and having a collector electrode connected to said switching means to supply it control current.

4. A temperature-sensitive control switch comprising:

a primary current supply, a current-controlled switching means, a temperature-sensing unit, and a plurality of transistors, included in said temperature sensing unit, each having a base and an emitter electrodes with a base-emitter junction therebetween and having a collector electrode, said base-emitter junction of said first transistor being connected with the base-emitter junctions of one-half of the remainder of said plurality of transistors in a first series combination, the base emitter junctions of the other half of the remainder of said plurality of transistors being connected in a second series combination, said first and said second series combinations being connected in parallel combination with each other so as to receive forward biasing current from said primary current supply, and so that the potential developed across said first series combination in response to its forward biasing current is applied to said second series combination, said first transistor collector electrode being connected to said current-controlled switching means to supply control current thereto, the collector electrodes of the remainder of said plurality of transistors each being connected to its respective electrode.

5. A temperature-sensitive control switch as claimed in claim 4 wherein said temperature sensing unit includes:

a further transistor with base and emitter electrodes and a base-emitter junction therebetween which junction is connected in parallel with the base-emitter junction of said first transistor and with a collector electrode connected to its base electrode.

6. A temperature-sensitive control switch as claimed in claim 4 wherein said primary current supply comprises:

a source of direct potential, a resistive element, an auxiliary transistor having a base electrode connected to said source of direct potential, an emitter electrode direct current conductively coupled to said parallel combination via said resistive element, and a collector electrode to receive operating current.

7. A temperature-sensitive control switch as claimed in claim 6 having:

a current amplifier with an input and an output terminals respectively connected to the collector electrodes of said auxiliary and said first transistors.

8. A temperature-sensitive control switch as claimed in claim 4 having:

an auxiliary current supply connected to said current-controlled switching means to counteract said control current over its lower range of values.

9. A temperature-sensitive switching circuit comprising, in combination;

first circuit means adapted to receive a substantially constant current and responding thereto with a voltage versus temperature characteristic in which said voltage decreases with increasing temperature;

second circuit means responsive to said voltage exhibited by said first circuit means, which second circuit means includes means which exhibit the same voltage versus temperature characteristic as said first circuit means if operated at the current level of said first circuit means but which receives a substantially smaller current than said first circuit means and at this smaller current, exhibits a voltage versus temperature characteristic in which said voltage decreases with increasing temperature at a more rapid rate than said first characteristic; and current supply means connected to said second circuit means for directing at least a portion of its current to said second circuit means in response to the requirement for more current by said second circuit means as the temperatures of said first and second circuit means rise together.

10. A temperature-sensitive switching circuit as set forth in claim 9, wherein said first circuit means comprises N series connected diodes and said second circuit means includes N + 1 series connected diodes, connected in parallel with said N series connected diodes.

11. A temperature-sensitive switching circuit as set forth in claim 10, wherein one of said diodes of said second circuit means comprises the base-emitter junction of a transistor, and in which said current supply means is connected to the collector of said transistor.

12. A temperature-sensitive switching circuit as set forth in claim 10, wherein all of said diodes comprise an integrated circuit formed on a common substrate.

13. A temperature-sensitive switching circuit as set forth in claim 12, wherein each of said diodes comprises the emitter-base junction of a transistor and all of said transistors are of the same conductivity type.

14. A temperature-sensitive switching circuit as set forth in claim 10, further including in said second circuit means a transistor having base, collector and emitter electrodes, and a junction between said base and emitter electrodes, said transistor being connected at its emitter electrode to one electrode of a diode in said second circuit means and at its base electrode to the other electrode of said diode, said connection being in a sense to permit current flow in the forward direction through said base-emitter junction, and said current current supply means being connected to the collector of said transistor.

15. In combination:

two groups of series connected diodes, the second including more diodes than the first;

a source supplying forward bias current to the two groups of diodes at a voltage level such that the first group draws substantially all of this current and the second draws only an infinitesimal portion of this current;

a second source independently supplying a current to the second group of diodes; and means responsive to a non-linear increase in the current conducted by said second group of diodes, said non-linear increase occurring when the temperature of both groups of diodes rises above a threshold value.

16. In the combination as set forth in claim 15, said second group of diodes consisting of one more diode than said first group.

17. In the combination as set forth in claim 15, at least one of the diodes in said second group comprising the emitter-base junction of a transistor, and said second source supplying its current to the collector of said transistor.

18. In combination:

a first circuit receiving a substantially constant current which produces an output voltage which decreases with temperature, a second circuit responsive to said output voltage which draws a current which increases with temperature and which decreases with voltage, but which increases with temperature at a more rapid rate than that at which it decreases with voltage, whereby at values of temperature above a threshold level, the total current drawn by said second circuit increases with temperature; and a current source connected to said second circuit for supplying the current required thereby as said temperature increases.

19. The combination as set forth in claim 18, further including:

apparatus to which power is applied in heat coupled relationship with said first and second circuits; and means controlled by said current source for reducing the power delivered to said apparatus and thereby reducing the heat delivered by said apparatus to said first and second circuit means when said current source supplies more than a given amount of its current to said second circuit.

20. A temperature sensing circuit comprising, in combination:

a first string of N series connected diodes, where N is an integer;

a current source connected across said string of diodes for operating said diodes in the forward direction to thereby develop an offset potential across said string of diodes;

a second string of M series connected diodes, where M is an integer greater than N;

means connecting said first string of diodes across said second string of diodes for applying said offset potential across said second string of diodes to forward bias them, for causing the diodes in the second string to operate in the region of their current versus temperature characteristic, which is substantially more non-linear than that of the diodes in the first string;

a transistor having a base-emitter junction and a collector electrode, said base-emitter junction comprising one of the diodes in said second string; and means other than said current source connected to the collector electrode of said transistor for providing an amount of current to said second string equal to the difference between that supplied by said current source to said second string and the total current required by said second string, caused by a change in temperature of said second string.

21. A temperature sensing circuit comprising, in combination:

a first string of N serially connected diodes, where N is an integer;

a current source connected across said first string of diodes for forward biasing each of said diodes in a region of its current versus voltage characteristics, thereby to develop an offset potential across said first string of diodes;

a second string of M serially connected diodes, where M is an integer greater than N;

means connecting said first string of diodes across said second string of diodes for applying said offset potential across said second string of diodes to forward bias each diode therewithin and to develop across it a smaller voltage than across each diode in the first string, so that each diode in the second string operates on a slope of its current versus voltage characteristic which is relatively shallow compared to the slope of the current versus voltage characteristic of each diode in the first string in its said region of forward bias;

a transistor having a base-emitter junction and a collector electrode, said base-emitter junction comprising one of the diodes in said second string; and means other than said current source connected to the collector electrode of said transistor for providing an amount of current to said second string equal to the difference between that supplied by said current source to said second string and the total current required by said second string, caused by a change in temperature of said second string.

* * * * *